United States Patent Office 3,340,232
Patented Sept. 5, 1967

3,340,232
SYNTHETIC RESIN WHICH IS REACTION PRODUCT OF ARYL DIAMINE AND AROMATIC ALDEHYDE AND PROCESS OF MAKING SAME
Harry A. Smith and William K. Carrington, Midland, Mich., assignors to The Dow Chemical Company, Midland, Mich., a corporation of Delaware
No Drawing. Filed Jan. 27, 1964, Ser. No. 340,493
11 Claims. (Cl. 260—48)

This invention relates to thermoplastic resins and to the process of preparing the same. More particularly, this invention relates to the process of preparing polymers by reacting an aromatic polyamide and an aryl aldehyde and the product thus produced.

Because of their cross-linked nature and heat and water sensitivity, urea-formaldehyde and melamine-formaldehyde resins as known to the art are not suitable for applications such as thin films, coatings, and water-resistant adhesives in which thermoplastic resins are normally employed.

The present invention has for one of its objects the provision of novel polymeric substances. Another object is to provide new compounds which are suitable for use as film-forming, coating, and adhesive materials. Other objects will appear hereinafter.

The polymers contemplated within the scope of this invention are formed by reacting an aromatic polyamine such as diaminodiphenyl ether with an aromatic aldehyde compound such as benzaldehyde at a molar ratio of aromatic polyamine to aryl aldehyde in the range of from 1:1 to 1:5, and in the presence of a small amount of a suitable ionic catalyst such as zinc chloride. The polymers so produced are essentially linear in nature. In general, the polymers contemplated by this invention have a molecular weight range of about 3,000 to 15,000 or more.

The aryl polyamines used in accordance with the present invention include those having the structural formula

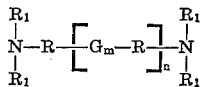

wherein R is a divalent radical independently selected from the group consisting of divalent aromatic radicals having at least one benzene ring and the alkyl, alkoxy, and halogen derivatives thereof; each $R_1$ is a radical independently selected from the group consisting of hydrogen and aliphatic hydrocarbon radicals containing up to four carbon atoms; and G is a divalent radical selected from the group consisting of divalent aliphatic hydrocarbon radicals containing up to 4 carbon atoms, oxygen, and sulfur; and $m$ is an integer from 0 to 1; and $n$ is an integer from 0 to 1.

Typical examples of the aryl polyamines which may be employed in the preparation of the polymers of the present invention include diaminobenzene, diaminotoluene, diaminoanisole, diaminochlorobenzene, diaminonaphthalene, diaminoanthracene, 4,4'-diaminodiphenyl, 4,4'-diaminodiphenylmethane, 4,4' - diaminodiphenylethane, 4,4'-diaminodiphenylether, and diaminodiphenyl sulfide.

Aryl aldehydes useful in accordance with the present invention include those having the following structural formula

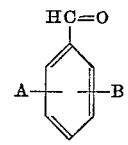

wherein A and B are radicals independently selected from the group consisting of hydrogen, alkyl, alkoxy, aryl, halo, and nitro radicals.

Typical aromatic aldehydes coming within the above definition include benzaldehyde, monoalkyl substituted benzaldehyde such as o-tolualdehyde, m-tolualdehyde and and corresponding ethyl-, propyl- and butyl-benzaldehydes, mono-alkoxy substituted benzaldehydes such as m-methoxy-benzaldehyde, o-methoxybenzaldehyde, etc., and the corresponding ethoxy-, propoxy- and butoxy-benzaldehydes, the aryl benzaldehydes such as phenyl benzaldehyde, the halogen derivatives of benzaldehyde such as chlorobenzaldehyde and bromobenzaldehyde and the nitrobenzaldehydes such as o-nitro-, m-nitro-, and p-nitrobenzaldehyde.

Suitable ionic catalysts include tertiary amines such as tri-n-butylamine, triethylene diamine, N-methyl morpholine, tetramethylethylenediamine, and "Lewis" acids; i.e., compounds of acid reaction such as $AlCl_3$, $SnCl_4$, $ZnCl_2$, $PCl_3$, boron halides, and the like.

The reaction is preferably carried out in the absence of diluent, for the presence of diluent increases reaction time. Moreover, the absence of solvent enhances the reactivity of the monomers and promotes a continued polymerizing reaction.

The polymers are usually prepared by mixing the polyamino aromatic material, the aryl aldehyde, and catalyst in a suitable reaction vessel. The reaction mixture is then heated to about 150° C. at atmospheric pressure or under vacuum. During the reaction, water is given off as by a by-product and the ceasing of its evolution in a convenient determinant of the end of the reaction. This water is removed in order to obtain a high degree of polymerization. The reaction can be conducted at elevated temperatures ranging from about 100° C. to as high as the boiling point of the reactants for periods of time ranging from 12 to 72 hours or longer. Such reaction times are also dependent, as will be apparent to those skilled in the art, upon the catalyst utilized and the temperature employed for the reaction. If the temperature is less than 100° C., water of condensation is not removed from the reaction zone and reaction is incomplete. If the temperature is above the boiling point of the reactants, monomer may be unnecessarily removed and lost from the reaction.

The polymers of this invention are resinous materials having high melting points (i.e., 125°–150° C.) which form adherent, tough, opaque, flexible, thermally stable, water insoluble films and coatings. The polymers may be applied as protective coatings to a variety of suitable substrates such as iron and aluminum in the molten state, or because of their solubility in a number of organic solvents such as methylene chloride, acetone, and benzene, they may be applied as solutions to these substrates.

3

While the invention is susceptible to considerable variation and modification in the manner of its practical application, particularly as regards the kind and amount of reactants, and the conditions of reaction such as temperature and catalysts employed, the following examples will serve to illustrate how the polymers of the present invention are prepared.

*Example I*

To a 250 ml. round bottom flask equipped with an air condenser were charged 20.0 grams (0.100 mole) of p,p'-diaminodiphenyl ether, 10.6 grams (0.100 mole) of benzaldehyde, and 1.4 grams (0.01 mole) of zinc chloride. The temperature of the reaction mixture was raised to 150° C. and the mixture heated for 24 hours, about 3.5 milliliters of water being evolved. The reaction mixture was then cooled, washed with dilute HCl to remove unreacted reagents and catalyst and dried in air. A greyish granular material was obtained in 88.3% yield. The material melted at 125°–155° C. to a black, glassy solid with adhesive properties. It was somewhat brittle but when heated to 150° to 160° C. and when coated on an aluminum sheet, cooled to an adherent, tough, opaque, flexible, thermally stable film. The amine-aldehyde product was soluble in methylene chloride, acetone, and benzene but was insoluble in ethanol and water.

*Example II*

To a 250 ml. round bottom flask equipped with an air condenser were charged 9.3 grams (0.100 mole) of p,p'-diaminodiphenyl ether and 10.6 grams (0.100 mole) of benzaldehyde. The temperature of the reaction mixture was raised to 150° C. and the mixture heated for 72 hours, about 3.5 milliliters of water being evolved. On cooling the reaction mixture, a grayish granular material was obtained in 94% yield which had a melting point of 132°–134° C. The material had physical and film-forming properties similar to the amine-aldehyde product obtained in Example I.

*Example III*

To a flask equipped with an air condenser were charged 10.8 grams (0.100 mole) of p-phenylene diamine, 10.6 grams (0.100 mole) of benzaldehyde, and 1.4 grams (0.01 mole) of zinc chloride. The temperature of the reaction mixture was raised to 150° C. and the mixture heated for 72 hours, 3.5 milliliters of water being evolved, and then cooled. A 20.3 grams or 96.7% yield was obtained of a greyish-colored material which had a melting point of 124°–131° C. This material exhibited physical and film-forming properties similar to the amine-aldehyde product obtained in Example I.

Infra-red and elemental analysis of the material indicated that the material had the following structure:

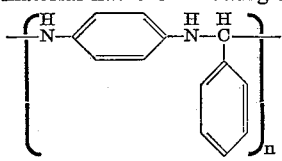

$n$ being an integer from 50 to 100.

The elemental analysis was as follows—Calculated (for $C_{13}H_{12}N_2$): carbon, 79.60; hydrogen, 6.16. Found (corrected for catalyst): carbon, 79.80; hydrogen, 5.95.

In place of the p-phenylene diamine use in the condensation reaction of the above example, there can be substituted any equivalent amount of the other aryl polyamines mentioned above such as diaminotoluene, diaminoanisole, diaminonaphthalene, etc., and in place of the benzaldehyde of the above Example I there can be substituted any equivalent amount of the other mentioned aromatic aldehydes such as as o-tolualdehyde, o-methoxybenzaldehyde, phenyl benzaldehyde, chlorobenzaldehyde, p-nitrobenzaldehyde, etc., to obtain film-forming synthetic resinous products generally similar to those shown in the above examples.

What is claimed is:

1. A linear film-forming synthetic resinous polymer comprising the reaction product of reactants consisting essentially of (a) an aromatic polyamine having the formula

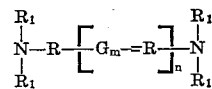

wherein R is a divalent radical independently selected from the group consisting of divalent aromatic radicals having at least one benzene ring and the alkyl, alkoxy, and halogen derivatives thereof; each $R_1$ is a radical independently selected from the group consisting of hydrogen and aliphatic hydrocarbon radicals containing up to four carbon atoms; G is a divalent radical selected from the group consisting of divalent aliphatic hydrocarbon radicals containing up to 4 carbon atoms, oxygen, and sulfur; $m$ is an integer from 0 to 1; and $n$ is an integer from 0 to 1; and, per mole thereof, from one to five moles of (b) an aryl aldehyde of the formula

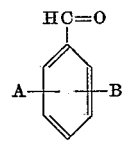

wherein A and B are independently selected from the group consisting of hydrogen, alkyl, alkoxy, aryl, halo, and nitro radicals, the reaction being carried out by heating the reactants in the presence of an ionic catalyst at reaction temperature in the range from about 100° C. to the boiling point of the reactants with evolution of by-product water.

2. The synthetic resinous polymer of claim 1 where the aryl aldehyde is benzaldehyde.

3. The synthetic resinous polymer of claim 1 wherein G is oxygen, $m$ is 1, and $n$ is 1.

4. A film-forming synthetic resinous polymer according to claim 1 where reactant (a) is diaminodiphenyl ether and reactant (b) is benzaldehyde.

5. The synthetic resinous polymer of claim 1 wherein $m$ is 0 and $n$ is 0.

6. A film-forming synthetic resinous polymer according to claim 1 where reactant (a) is diaminobenzene and reactant (b) is benzaldehyde.

7. A process for producing linear film-forming synthetic polymer resins which comprises heating at a temperature of 100°–200° C. reactants consisting essentially of one mole of (a) an aromatic polyamine of the formula

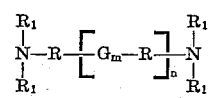

wherein R is a divalent radical independently selected from the group consisting of divalent aromatic radicals having at least one benzene ring and the alkyl, alkoxy, and halogen derivatives thereof; each $R_1$ is a radical independently selected from the group consisting of hydrogen and aliphatic hydrocarbon radicals containing up to four carbon atoms; G is a divalent radical selected from the group consisting of divalent aliphatic hydrocarbon radicals containing up to 4 carbon atoms, oxygen, and sulfur; $m$ is an integer from 0 to 1; and $n$ is an integer from 0 to 1; and (b) from 1 to 5 moles of an aryl aldehyde of the formula

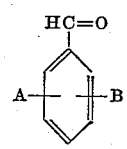

wherein A and B are independently selected from the group consisting of hydrogen, alkyl, alkoxy, aryl, halo, and nitro radicals, in the presence of an ionic catalyst until water is substantially completely eliminated from the reaction mixture.

8. The process of claim 7 wherein the aromatic polyamine is p,p'-diaminodiphenyl ether.

9. The process of claim 7 wherein the aromatic polyamine is p-phenylene diamine.

10. The process of claim 7 wherein the aryl aldehyde is benzaldehyde.

11. The process of claim 7 wherein the catalyst is zinc chloride.

References Cited

UNITED STATES PATENTS

| 2,458,527 | 1/1949 | Oberright | 252—33.6 |
| 2,892,811 | 6/1959 | Irany | 260—72 |
| 3,134,755 | 5/1964 | Muller et al. | 260—72.5 |

OTHER REFERENCES

Richter: Organic Chemistry, 3rd ed., 1952, p. 690.

WILLIAM H. SHORT, *Primary Examiner.*

H. S. CHAIN, *Assistant Examiner.*